United States Patent [19]
Peeples et al.

[11] Patent Number: 5,964,365
[45] Date of Patent: Oct. 12, 1999

[54] LID/COLLAR SYSTEM

[75] Inventors: Kathleen G. Peeples, Houston, Tex.; James M. Degen, Cayucos; Barry Wingate, San Jose, both of Calif.

[73] Assignee: Igloo Products Corp., Houston, Tex.

[21] Appl. No.: 08/843,215

[22] Filed: Apr. 14, 1997

[51] Int. Cl.$^6$ ................................................. B65D 21/02
[52] U.S. Cl. ........................ 220/23.87; 220/592.23; 220/23.91; 220/780; 220/319
[58] Field of Search ............................ 220/319, 780, 220/781, 782, 793, 643, 646, 647–649, 574, 408, 405, 912, 634, 629, 630, 23.86, 23.6, 23.4, 592.23, 592.24, 592.2, 574.3, 495.03, 495.05, 23.87, 23.89, 23.9, 23.91, 573.4; 215/274; 206/557

[56] References Cited

U.S. PATENT DOCUMENTS

| | | |
|---|---|---|
| 25,906 | 11/1859 | Livingstone . |
| 2,752,970 | 7/1956 | Tupper . |
| 2,765,831 | 10/1956 | Tupper . |
| 3,070,275 | 12/1962 | Bostrom . |
| 3,164,285 | 1/1965 | Melich ........................ 220/574 X |
| 3,307,602 | 3/1967 | Boster ........................ 220/780 X |
| 3,335,774 | 8/1967 | Reed . |
| 3,381,872 | 5/1968 | Holder et al. . |
| 3,613,940 | 10/1971 | Davis . |
| 3,643,830 | 2/1972 | Kinney . |
| 3,677,435 | 7/1972 | Davis . |
| 3,692,208 | 9/1972 | Croyle et al. . |
| 3,971,360 | 7/1976 | Spoeth, Jr. ........................ 220/408 X |
| 4,266,689 | 5/1981 | Asher . |
| 4,293,080 | 10/1981 | Letica . |
| 4,379,455 | 4/1983 | Deaton ........................ 220/319 X |
| 4,770,318 | 9/1988 | Earl . |
| 4,880,951 | 11/1989 | Levinson ........................ 220/408 X |
| 4,958,744 | 9/1990 | Bayly . |
| 5,012,928 | 5/1991 | Proffitt et al. . |
| 5,018,624 | 5/1991 | Arneson et al. ........................ 206/557 X |
| 5,266,763 | 11/1993 | Colombo . |
| 5,356,026 | 10/1994 | Andress et al. . |
| 5,366,103 | 11/1994 | Abernathy et al. ........................ 220/574 X |
| 5,472,542 | 12/1995 | Wermund . |
| 5,474,199 | 12/1995 | Julius et al. ........................ 220/339 |
| 5,644,976 | 7/1997 | Muchin et al. ........................ 220/574 X |

*Primary Examiner*—Stephen K. Cronin
*Assistant Examiner*—Nathan Newhouse
*Attorney, Agent, or Firm*—Pillsbury Madison & Sutro LLP

[57] ABSTRACT

A reusable transport and containment system for a pan or dish having a peripheral flange. The system includes a manually graspable collar that acts as support around the perimeter of the pan and a lid that sealingly engages the collar. The coupled lid and collar insulate the pan's contents while shielding the food handler's hands from the pan and its contents.

24 Claims, 6 Drawing Sheets

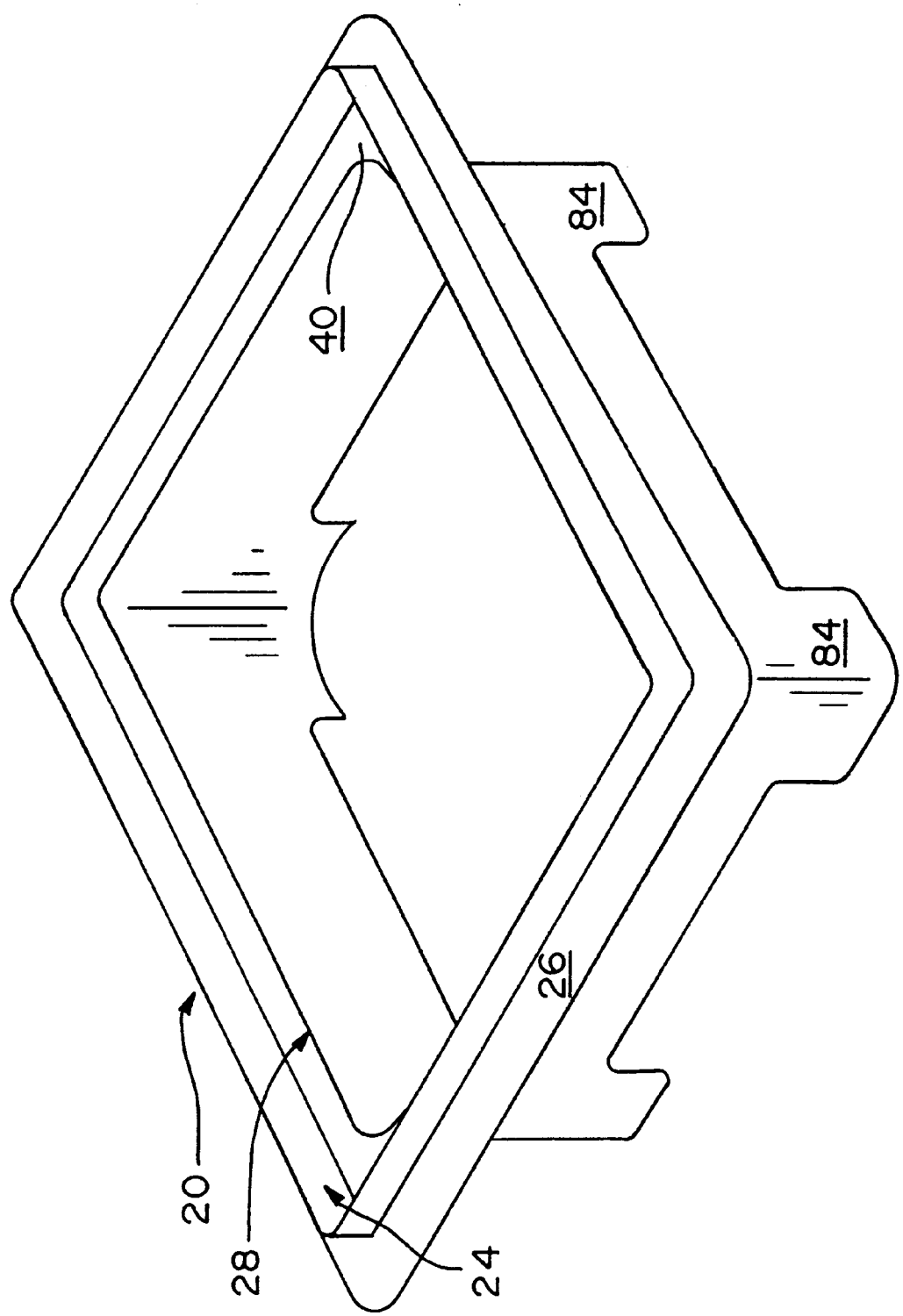

LID/COLLAR SYSTEM

BACKGROUND OF THE INVENTION

1. Field of the Invention

This invention relates to a reusable transport and containment system designed for the easy transportation and storage of pans or dishes used primarily in the preparation, cooking, presentation, and storage of foods.

2. Description of the Related Art

Steaming pans and chafing dishes are typically covered with plastic wrap or aluminum foil when they are transported. Sometimes, they are not covered at all. Such coverings, or lack thereof, are inefficient and ineffective because they do not effectively prevent spillage and they expose the carrier's hands to the temperature of the pan or dish. Furthermore, even when covered with plastic wrap or foil, both hot and cold items will migrate quickly towards the ambient temperature.

SUMMARY OF THE INVENTION

It is an object of the present invention to address the transport and containment problems noted above. Thus, the inventors were faced with the problem of providing a system for transporting steaming pans and the like that is easy to carry, provides a cover or lid, to avoid or minimize spillage, and has insulating properties as well. The invention accomplishes the foregoing and other objects by providing a collar that receives a pan and supports the rim or flange of the pan and also engages a lid to cover the pan and contain its contents. More particularly, the inventors have created a reusable transport and containment system that has (a) a manually graspable collar that acts as support around the perimeter of the pan; (b) has a lid that sealingly engages the collar; and (c) insulates the pan's contents while shielding the food handler's hands from the pan and its contents.

Thus the invention utilizes a collar that includes a carrying flange or grip, giving the food handler the ability to more easily carry a hot or cold pan or dish. The collar isolates the pan flange and side wall from the food handler and thereby minimizes the risk of scalding from spillage or contact with the pan.

The collar also has a generally horizontal interior ledge that allows the pan to seat within the collar. Because the edges of chafing dishes and steaming pans can vary in cross-sectional configuration, the horizontal ledge permits a variety of pans to be received and carried in the collar.

In addition to containment of spillage, the isolation of the food product from ambient atmosphere provided by the collar and lid assembly retards the migration of the food towards the ambient temperature and precludes access to the food by flying or crawling pests.

Other objects, features, and characteristics of the present invention as well as the methods of operation and functions of the related elements of structure, and the combination of parts and economies of manufacture, will become more apparent upon consideration of the following description and the appended claims with reference to the accompanying drawings, all of which form a part of this specification.

BRIEF DESCRIPTION OF THE DRAWINGS

FIG. 8 is a perspective view of another alternative collar structure.

DETAILED DESCRIPTION OF THE INVENTION

The transport and containment system provided in accordance with the present invention is composed of a lid and collar adapted to securely attach to one another. The collar is designed to receive and support during transport a conventional steaming pan or the like. The preferred embodiment comprises a ring-like collar having an annular ridge, namely a collar ridge, and a gripping collar flange. In the most preferred, illustrated embodiment the collar flange is angled generally downwardly with respect to horizontal to provide for a secure grip. As an alternative, but less desirable for the reasons noted, the collar flange can project horizontally. The collar flange advantageously distances the pan or dish from the user's hands and provides a wide surface area which the user may grasp.

The collar also has a pan receiving portion including a generally horizontal ledge for receiving the peripheral rim or flange of the steaming and, in the preferred embodiment, a generally vertical wall for surrounding and accommodating the peripheral wall of the pan. This design ensures that the inventive collar can receive and accommodate a wide variety of pans and dishes.

The containment and transport system of the invention further includes a lid or cover member. In the illustrated embodiment, the lid has a flange and a ridge, namely a lid ridge. The lid ridge is designed to sealingly engage the collar ridge and thereby form a substantially fluid tight seal. The lid flange allows the food handler to quickly and easily separate the lid from the collar. While in the illustrated embodiment the lid flange extends around the entire periphery of the lid, it is to be appreciated that the lid flange may take the form of a tab-like structure, or may be discontinuously defined about the periphery of the lid.

Although the specification references dishes and pans, and specifically chafing dishes and steaming pans, it should be appreciated that the present invention can be used with any of a variety of vessels that incorporate a rim, flange, or lip that can engage the collar ledge.

Figure 1:
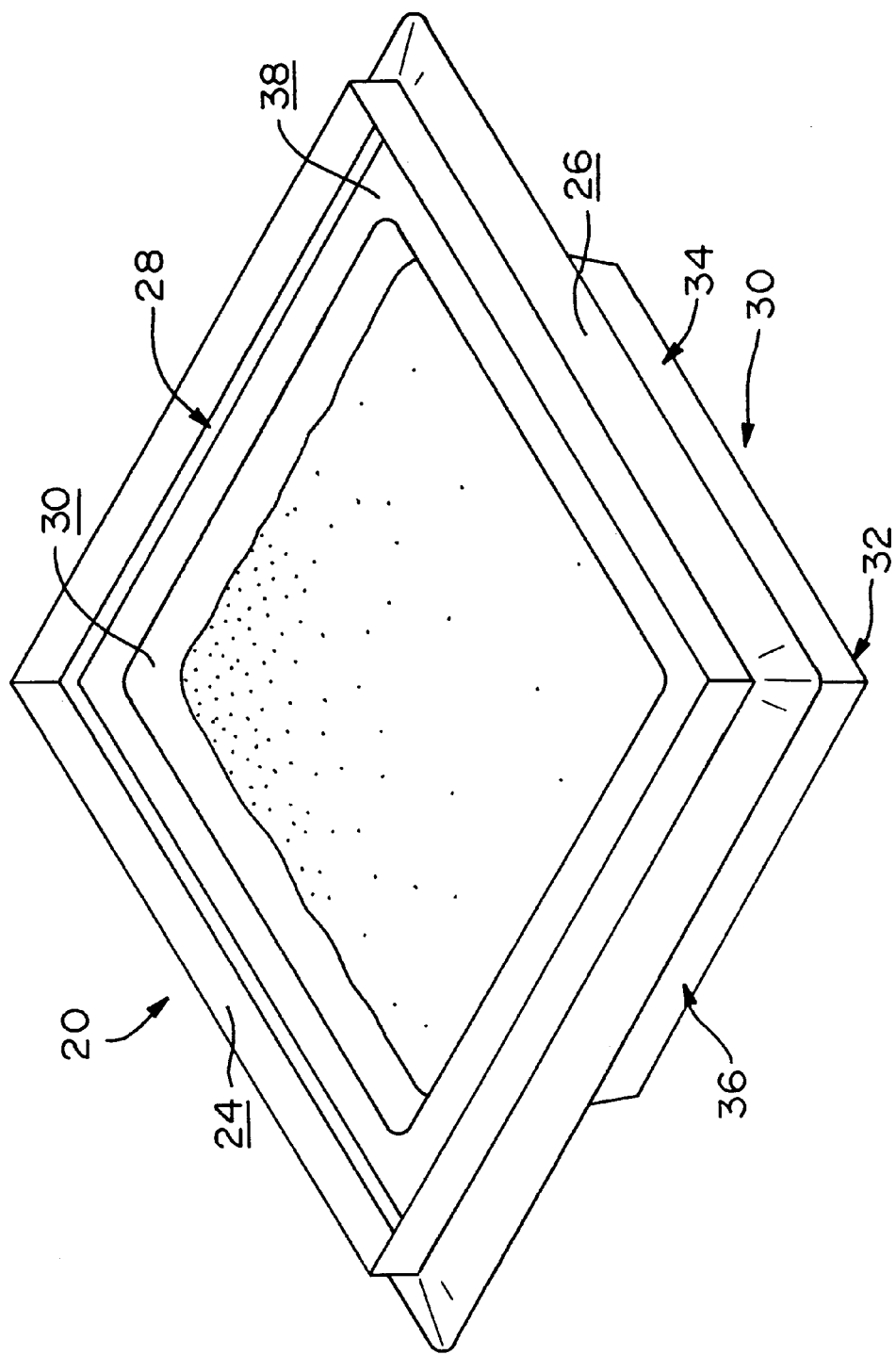
FIG. 1 is a perspective view of the collar in use with a pan.
Figure 2:
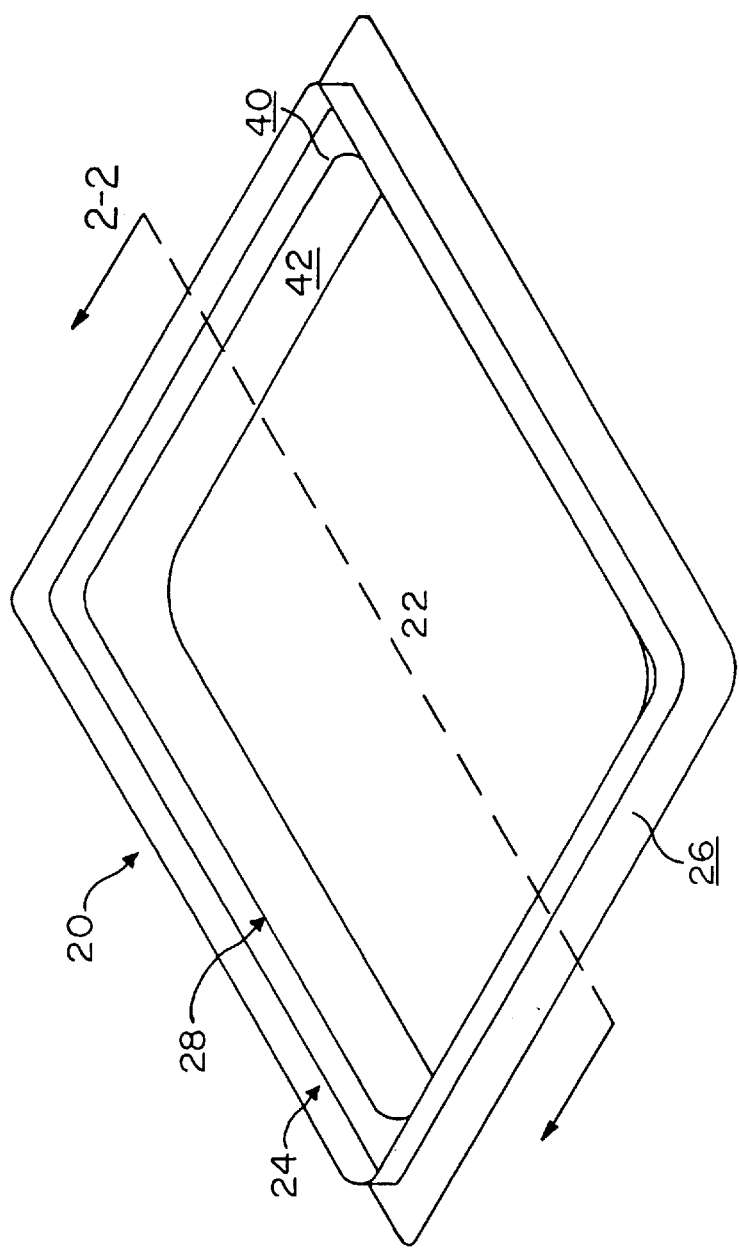
FIG. 2 is a perspective view of the collar alone.

As can be seen in the embodiment shown in FIGS. 1 and 2, collar 20 defines an opening 22 into which a pan 30 can be inserted. The pan 30 schematically shown in FIG. 1 is a conventional pan that is commonly used throughout the world in buffet style serving lines and cafeterias and is often referred to as a steaming pan. A steaming pan is typically made from stamped sheet metal, is square or rectangular in shape, and has a bottom, side walls, end walls and a flange or rim.

FIG. 1 shows the collar 20 with a collar ridge 24 extending generally vertically with respect to the horizontal and a collar flange 26 angled downward with respect to the horizontal. Also shown in FIG. 1 is a pan 30, complete with a bottom 32, end walls 36, side walls 34, and pan flange 38. In the illustrated embodiment, the two side walls 34 are depicted as being longer that the end walls 36 thereby forming a rectangular pan.

Figure 3:
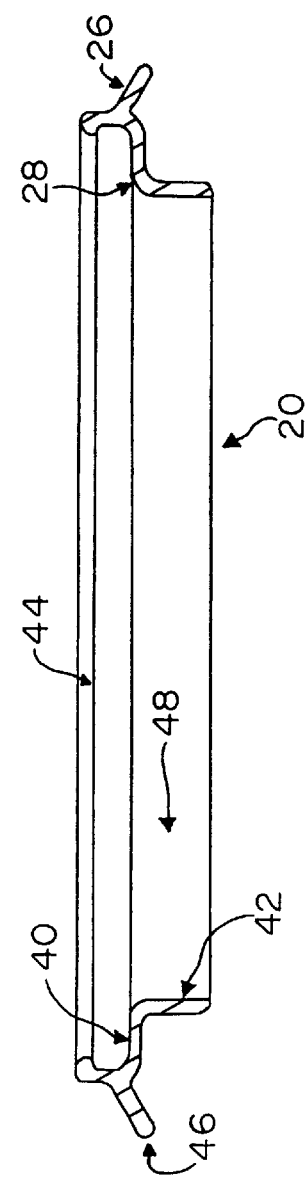
FIG. 3 is a side view of the collar taken along line 2—2 of FIG. 2.

The collar ridge 24, the collar flange 26, the pan opening 22, and the pan receiving area 28 can be more clearly seen in FIGS. 2 and 3 than in FIG. 1 because the pan 30 has been removed. Also provided on the inside 48 of the collar 20 is a generally horizontal ledge 40 on which the pan flange 38 is seated in use, and a generally vertical wall 42 for accommodating the side walls 34 and end walls 36 of the pan 30.

Figure 5A:
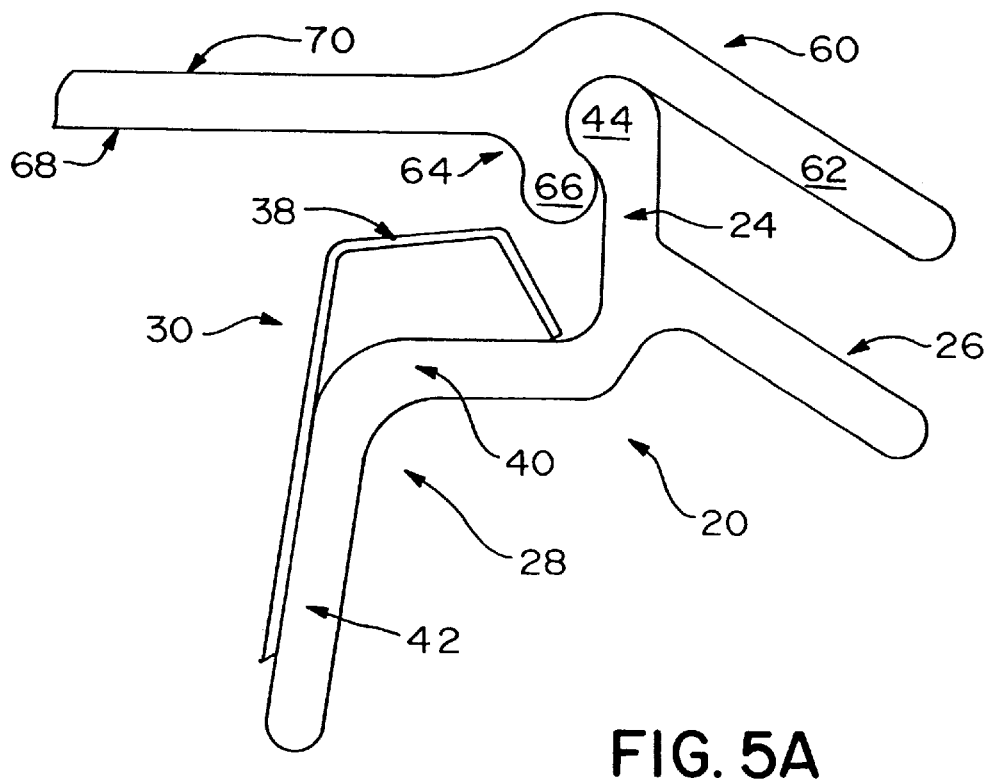
FIG. 5A is a cross sectional view of the lid and collar taken along line 4—4 of FIG. 4, and further showing a broken away cross-section of a pan seated therein.
Figure 5B:
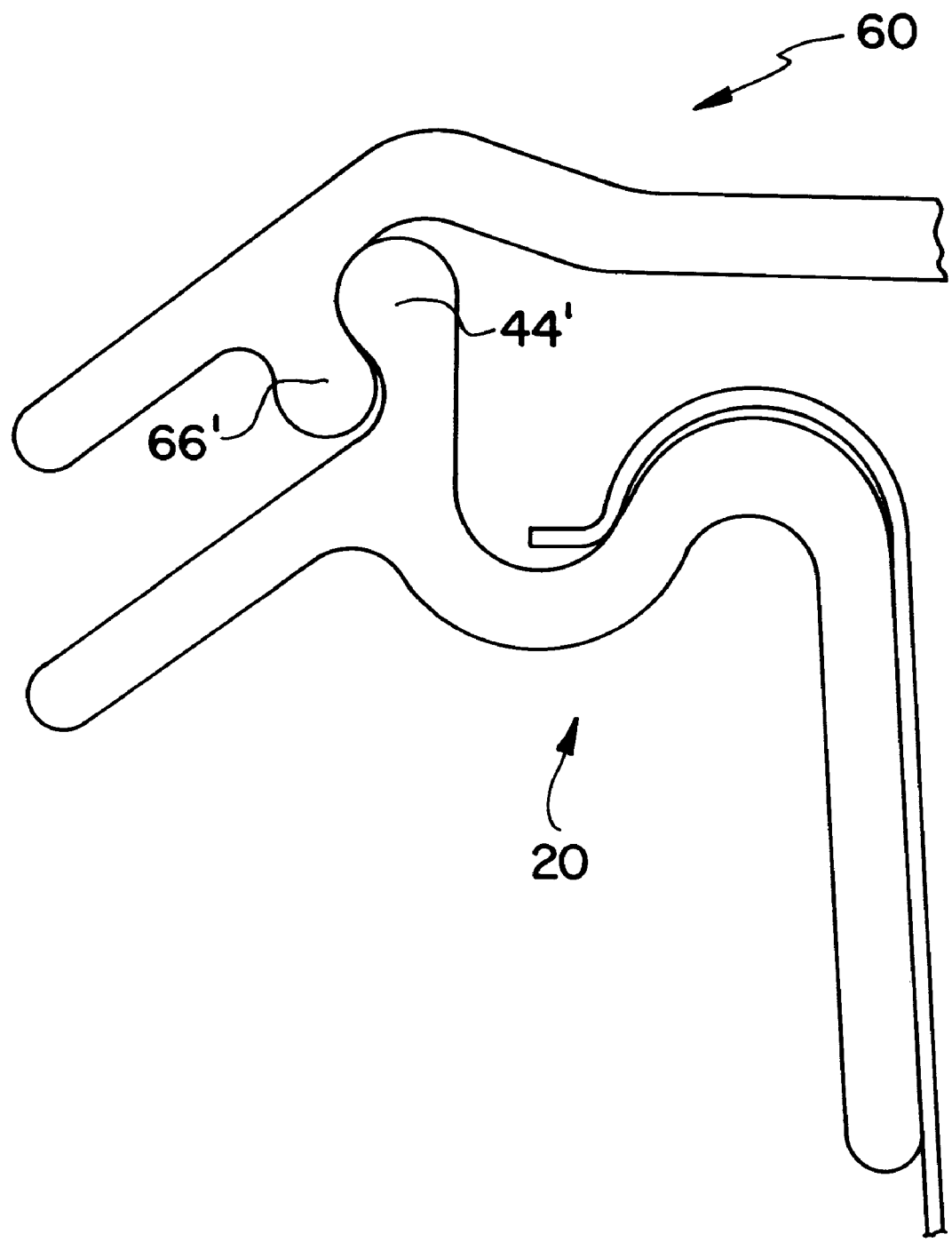
FIG. 5B is a cross sectional view of an alternate disposition of the lid and collar taken along line 4—4 of FIG. 4.

FIG. 3 is a side view of the collar taken along line 2—2 of FIG. 2. This sectional view shows the horizontal ledge 40 and vertical wall 42 of the pan receiving area 28 and the collar flange 26 in greater detail. FIGS. 3 and 5A–B perhaps best show how the collar flange 26 is preferably angled slightly downward with respect to the horizontal. It should be appreciated that the collar flange 26 can take many forms including a pair of handles on opposing sides of the collar or a collar flange that extends only on two sides of the collar or is discontinuous. Furthermore, the collar flange can define hand holds that allow the carrier's hand to actually pass through the collar flange. The collar flange 26 can also be provided with a pouring spout (not shown) that allows for the material within the pan to poured. Also visible in FIG. 3 is the collar ridge lip 44 which sealingly engages the lid ridge lip 66 as described below with reference to FIG. 5A. The seal between the collar and the lid, about the periphery of the lid/collar system and between lips 44 and 66 in vertical cross-section, can be continuous or discontinuous as deemed necessary or desirable. Although a continuous seal is shown in the drawings, a spot sealed configuration is less complicated to tool and mold.

Figure 4:
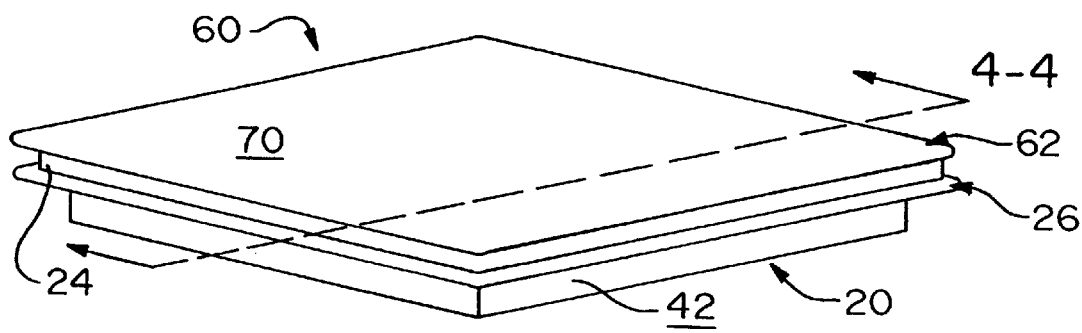
FIG. 4 is a perspective view of the collar and lid.

The lid 60 and collar 20 are coupled together for transport and storage as shown in FIGS. 4 and 5A–B. As is apparent, lid flange 62 facilitates the disassociation of lid 60 from the collar 20. Of course, the lid flange 62 can in addition or in the alternative include a tab formation or other gripable structure.

Two alternate embodiments of the interfitment of lid 60 and collar 20 in accordance with the invention are shown in FIGS. 5A–B. The lid 60 has an upper surface 70 and a lower surface 68 and lid flange 62 is defined about the periphery thereof. Preferably, the lid flange 62 is angled downwardly with respect to the horizontal, parallel to collar flange 26. The lid also has a lid ridge 64 projecting from the lower side thereof. In one embodiment, the lid ridge 64 has a lid ridge lip 66 that snugly engages with an inner periphery of the collar ridge lip 44 so as to lock the lid to the collar thereby providing a secure and reliable transport system. In an alternative embodiment, the lid ridge lip 66' engages an outer periphery of collar ridge lip 44'.

Figure 6:
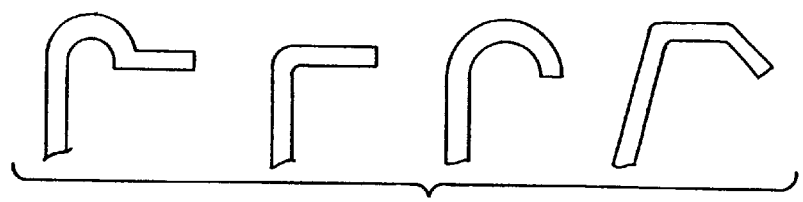
FIG. 6 is a cross sectional view of the edge configuration of three pans, each of which can be seated in the collar of the invention.

As noted above, the pan receiving area 28 includes horizontal ledge 40 and vertical wall 42. The pan flange 38 is seated on the horizontal ledge 40 of the pan receiving area 28 of the collar 20. Various pan flanges 38 are shown in FIG. 6 and it can be appreciated that each of these will seat effectively on the horizontal ledge 40 of the pan receiving area 28 of the collar. In the preferred embodiment, the vertical portion 42 of the collar 20 engages the side walls 34 and/or end walls 36 of the pan 30. However, such engagement is unnecessary as long as the pan flange seats on the ledge and shifting of the pan will not cause the pan to horizontally disengage from the ledge.

The collar can have a height less than, equal to or greater than the pan. It is to be understood that a shorter collar will facilitate placement and removal of the pan. On the other hand, a taller collar will facilitate lid attachment and removal.

Figure 7:
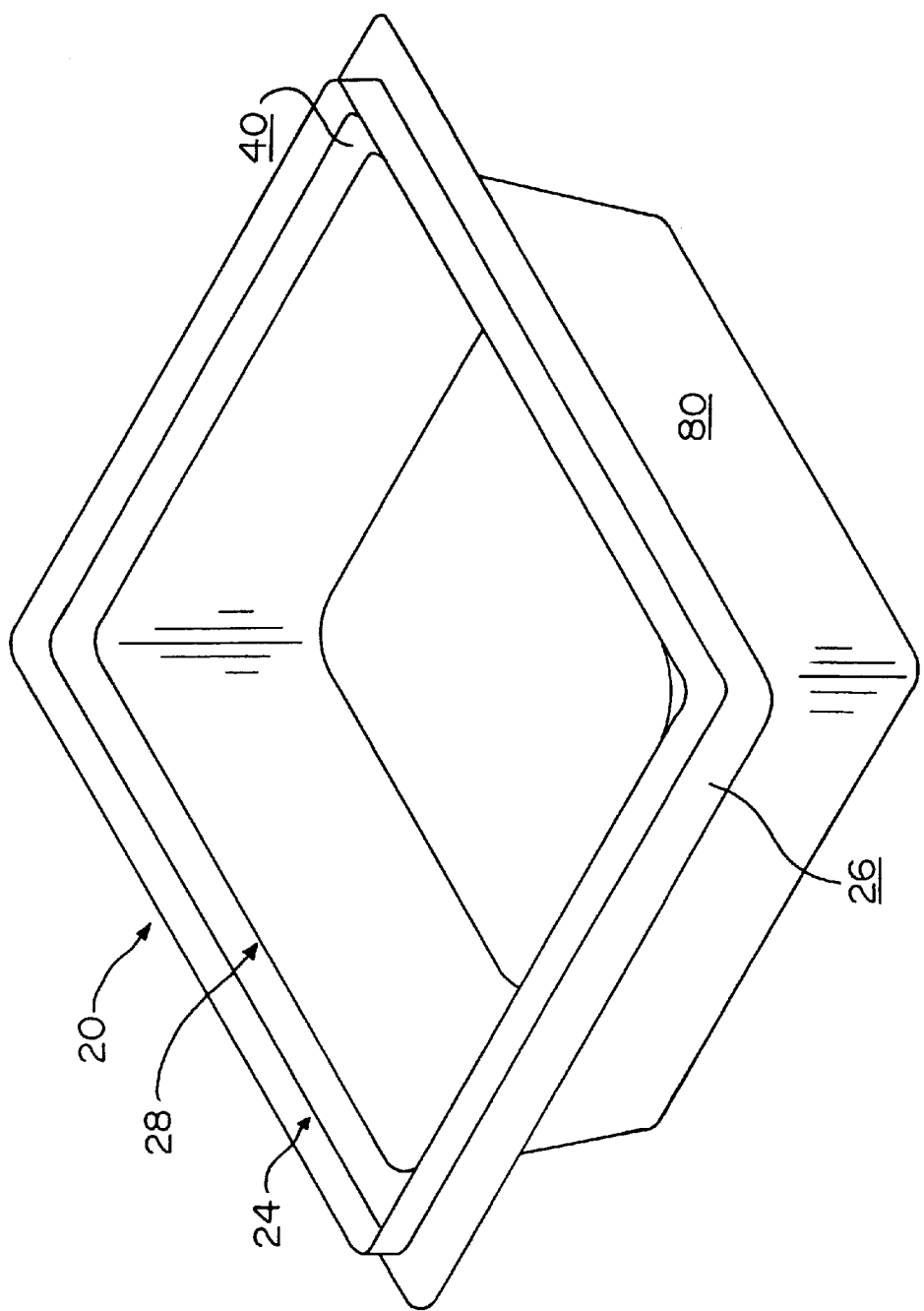
FIG. 7 is a perspective view of an alternate collar structure.

The collar 20 can, in the alternative, define a fully enclosing vessel as depicted in FIG. 7. As shown, the lower portion of the vessel 80 will completely enclose the lower portion of a pan, once the pan is inserted into the collar 20. However such containment may hamper removal of the pan, particularly when full of food. Such an embodiment would, therefore, be best suited to table top placement of pans, with the collar containers providing an ornamental/aesthetic function as well. The collar 20 can also be formed with feet or legs 84 as shown in FIG. 8 or otherwise have an open bottom and perforated sides. This allows the collar to support the pan on a table top while facilitating pan removal and providing ventilation e.g., for sterno cans.

While the invention has been described in connection with what is presently considered to be the most practical and preferred embodiment, it is to be understood that the invention is not to be limited to the disclosed embodiment. The invention is intended to cover various modifications and equivalent arrangements included within the spirit and scope of the appended claims.

Thus, it is to be understood that variations in the particular elements, configuration and materials employed can be made without departing from the novel aspects of this invention as defined in the claims.

What is claimed is:

1. A lid containment and transport system comprising:
   a lid having upper and lower surfaces, a peripheral edge, an annular lid skirt depending generally downwardly from said lower surface so as to terminate in a free edge, and a lid flange defined about at least a portion of and extending generally outwardly from said peripheral edge;
   a collar having inner and outer surfaces and defining an inner, pan receiving area; said collar comprising a pan flange engaging portion and a generally upwardly projecting collar skirt that terminates in a free edge and is constructed and arranged to sealingly engage the lid skirt; and
   a pan having a side wall and a bottom wall and a peripheral flange defined at an upper, end of said side wall, said pan being seated in said pan receiving area, with said peripheral flange engaging said pan flange engaging portion of said collar,
   wherein when said upwardly projecting collar skirt sealingly engages the lid skirt, said lower surface of said lid is vertically spaced from said peripheral flange of said pan.

2. A system as claimed in claim 1 wherein the collar further comprises a collar flange defined about at least a portion of and projecting outwardly from said outer surface, and wherein said lid flange and said collar flange are disposed in generally parallel but spaced apart relation when said collar skirt is sealingly engaged with said lid skirt.

3. A system as claimed in claim 2 wherein the collar flange is inclined downwardly with respect to horizontal.

4. A system as claimed in claim 1 wherein the lid flange is defined about substantially the entire periphery of the lid.

5. A system as claimed in claim 1 wherein the lid flange is inclined downwardly with respect to horizontal.

6. A system as claimed in claim 1 wherein the collar further comprises a bottom portion that covers at least a portion of the bottom wall of the pan.

7. A system as claimed in claim 1 wherein the lid skirt includes a bulbous outer lip portion and the collar skirt includes a bulbous inner lip portion and said lid skirt is received inside said collar skirt.

8. A system as claimed in claim 1 wherein the lid skirt includes a bulbous inner lip portion and the collar skirt includes a bulbous outer lip portion and said collar skirt is received inside said lid skirt.

9. A system as claimed in claim 1 wherein the collar includes a plurality of downwardly depending leg elements, said leg elements being adjacent a vertically lower outer periphery of said collar, said collar being substantially free from a bottom wall whereby a bottom surface of said pan is exposed to atmosphere.

10. A system as claimed in claim 1 wherein the pan flange engaging portion comprises a generally horizontal ledge for receiving the pan flange and a generally vertical wall for accommodating the side wall of the pan.

11. A lid and collar system comprising:

a lid having upper and lower surfaces, a peripheral edge, an annular lid skirt depending generally downwardly from said lower surface so as to terminate in a free edge, and a flange defined about at least a portion of and extending generally outwardly from said peripheral edge;

a collar having inner and outer surfaces and defining an inner pan receiving area, said collar comprising a pan flange engaging portion and a generally upwardly projecting collar skirt that terminates in an upper free edge, said collar being constructed and arranged to sealingly engage the lid skirt; the pan flange engaging portion including a generally horizontal ledge for receiving a pan flange; said collar skirt being defined about an outer periphery of said horizontal ledge, and wherein when said upwardly projecting collar skirt sealingly engages the lid skirt, said lower surface of said lid is vertically spaced from a pan flange of a pan seated in said collar.

12. A system as in claim 11, wherein said collar terminates inwardly of said horizontal ledge in an inner peripheral free edge.

13. A system as in claim 12, wherein said collar further comprises a generally vertical wall depending downwardly from adjacent an inner peripheral edge of said ledge, a bottom edge of said wall defining said inner peripheral free edge.

14. A system as in claim 11, wherein the collar further comprises a collar flange defined about at least a portion of and projecting outwardly from said outer surface, and wherein said lid flange and said collar flange are disposed in generally parallel but spaced apart relation when said collar skirt is sealingly engaged with said lid skirt.

15. A system as claimed in claim 14, wherein the collar flange is inclined downwardly with respect to horizontal.

16. A system as claimed in claim 11, wherein the lid flange is defined about substantially the entire periphery of the lid.

17. A system as claimed in claim 11, wherein the lid flange is inclined downward with respect to horizontal.

18. A system as claimed in claim 11, wherein the lid skirt includes a bulbous outer lip portion and the collar skirt includes a bulbous inner lip portion and said lid skirt is received inside said collar skirt.

19. A system as claimed in claim 11, wherein the lid skirt includes a bulbous inner lip portion and the collar skirt includes a bulbous outer lip portion and said collar skirt is received inside said lid skirt.

20. A system as claimed in claim 11, wherein the collar includes a plurality of downwardly depending leg elements, said leg elements being adjacent a vertically lower outer periphery of said collar, said collar being substantially free from a bottom wall whereby a bottom surface of a pan seated therein is exposed to atmosphere.

21. A lid and collar system comprising, in combination:

lid having upper and lower surfaces, a peripheral edge, an annular lid skirt depending generally downwardly from said lower surface and a flange defined about at least a portion of said peripheral edge, wherein the lid skirt terminates in a downwardly disposed free edge and includes a bulbous outer lip portion and an outer recess portion;

a collar structure having a generally upwardly projecting annular collar skirt constructed and arranged to sealingly engage the lid ridge; the collar skirt terminating in an upwardly disposed free edge and including a bulbous inner lip portion, and said annular lid skirt being sized so as to be selectively received inside said annular collar skirt with said inner lip portion of said collar skirt engaging said outer recess portion of said lid skirt and said outer lip portion of said lid skirt locked inside and vertically below said inner lip portion of said collar skirt.

22. A system as in claim 21, wherein the collar structure further comprises a collar flange defined about at least a portion of and projecting outwardly from said collar ridge, and wherein said lid flange and said collar flange are disposed in generally parallel but spaced apart relation when said collar skirt is sealingly engaged with said lid skirt.

23. A system as claimed in claim 22, wherein the collar flange is inclined downwardly with respect to horizontal.

24. A system as claimed in claim 21, wherein said collar system further comprises a generally horizontal ledge, said collar ridge being defined about an outer periphery of said horizontal ledge.

* * * * *